Nov. 18, 1969  F. J. ZAVASNIK  3,479,422

TUBULAR EXTRUSION HAVING INTEGRAL WEB

Filed Oct. 27, 1966  3 Sheets-Sheet 1

INVENTOR.
F. J. ZAVASNIK
BY Young & Quigg
ATTORNEYS

Nov. 18, 1969   F. J. ZAVASNIK   3,479,422
TUBULAR EXTRUSION HAVING INTEGRAL WEB
Filed Oct. 27, 1966   3 Sheets-Sheet 2

INVENTOR.
F. J. ZAVASNIK
BY Young & Quigg
ATTORNEYS

Nov. 18, 1969    F. J. ZAVASNIK    3,479,422
TUBULAR EXTRUSION HAVING INTEGRAL WEB
Filed Oct. 27, 1966    3 Sheets-Sheet 3

INVENTOR.
F. J. ZAVASNIK
BY *Young + Quigg*
ATTORNEYS

United States Patent Office 3,479,422
Patented Nov. 18, 1969

3,479,422
TUBULAR EXTRUSION HAVING INTEGRAL WEB
Frederick J. Zavasnik, Bartlesville, Okla., assignor to Phillips Petroleum Company, a corporation of Delaware
Filed Oct. 27, 1966, Ser. No. 589,976
Int. Cl. B29d 23/02
U.S. Cl. 264—98                                         9 Claims

ABSTRACT OF THE DISCLOSURE

A parison with an integral closed end is formed by extruding a tube from a die having a mandrel with a movable core. After the desired length of tubular extrudate has been formed, the movable core is retracted and a plug of plastic extruded into the space in front of the movable core. The movable core is then advanced to its original position, thus injecting the plug of plastic into the tubular extrudate where it fuses to the inner surface of the tubular extrudate to form a web across the diameter of the tubular extrudate. This process lends itself to forming a continuous tubular extrudate with a series of webs across its diameter which extrudate is then severed radially through the midpoint of each web and through the midpoint of each tubular section.

---

This invention relates to a process and apparatus for the formation of tubular plastic extrudates. In another aspect it relates to a novel method and apparatus for forming a parison for blow molding.

Blow molded articles are well known in the art. Blow molding is generally used for forming hollow articles such as bottles and jars made of thermoplastic material. In accordance with the general blow molding practice, a parison is extruded, one end of the parison is pinched off, usually by the closing of two mold halves and a differential pressure is applied between the inner and outer portions of the parison to expand the same out against the mold surface. While blow molding patents go back to 1851 it was not until after 1958 that blow molding began to achieve substantial commercial success. Today it is one of the major techniques for fabricating thermoplastic materials. While it is apparent from the spectacular commercial success of blow molding techniques in recent years that excellent products can be obtained, this technique is not without its defects.

One shortcoming of this technique is that the parison is generally quite molten at the time it is blown out against the walls of the mold. Most thermoplastic materials exhibit the peculiar phenomenon of increasing in strength as much as 20 fold or more when stretched at what is known as the "orientation temperature." For most plastics this orientation temperature is just below the melting temperature for the particular material and is better achieved on a heating cycle than on a cooling cycle. It is apparent that the stretching occurring during the blowing of an item utilizing conventional blow molding techniques fails to take full advantage of this orientation principle since the parison is generally too hot and is, of course, on the cooling cycle. Furthermore what little orientation that does occur is substantially all in the circumferential direction since little or no longitudinal stretching occurs. It has been proposed to circumvent this shortcoming by extruding a parison in the form of a tube, cooling said tube, cutting it into sections, reheating it to orientation temperature, stretching it longitudinally, and forming the object by blow molding. This results in a product which is highly oriented in all directions. However difficulty is frequently encountered using this technique in sealing one end of the parison to form the bottom of the blown item since the temperature which is ideal for orientation is too low for obtaining good fusion of the plastic. Also this technique results in excess scrap production in the formation of the ends; yet sealing off the end properly is of vital importance; even with conventional blow molding techniques the bottom area where the parison is pinched off is frequently the weakest point and hence a source of failure in the molded item.

It is an object of this invention to provide a method and apparatus for forming a tubular extrudate with an integral web across its diameter.

It is a further object of this invention to provide a method and apparatus for forming a parison preform with an integral closed end.

It is a still further object of this invention to make possible the production of blow molded items wherein the end of the parison is closed at the ideal temperature for fusion of the plastic and yet the blowing is done at the ideal temperature for orientation.

It is yet a further object of this invention to make possible the production of biaxially oriented blow molded items wherein the end of the parison is closed at the ideal temperature for fusion of the plastic and yet the blowing is done at the ideal temperature for orientation.

In accordance with this invention a parison with an integral closed end is formed by extruding a tube from a die having a mandrel with a movable core. After the desired length of tubular extrudate has been formed the movable core is retracted and a plug of plastic extruded into the space in front of the movable core. The movable core is then advanced to its original position, thus injecting the plug of plastic into the tubular extrudate where it fuses to the inner surface of the tubular extrudate to form a web across the diameter of the tubular extrudate which will become the bottom end of the item to be blown.

In the drawings, forming a part hereof, in which like reference characters indicate corresponding parts in all views.

Figure 1:
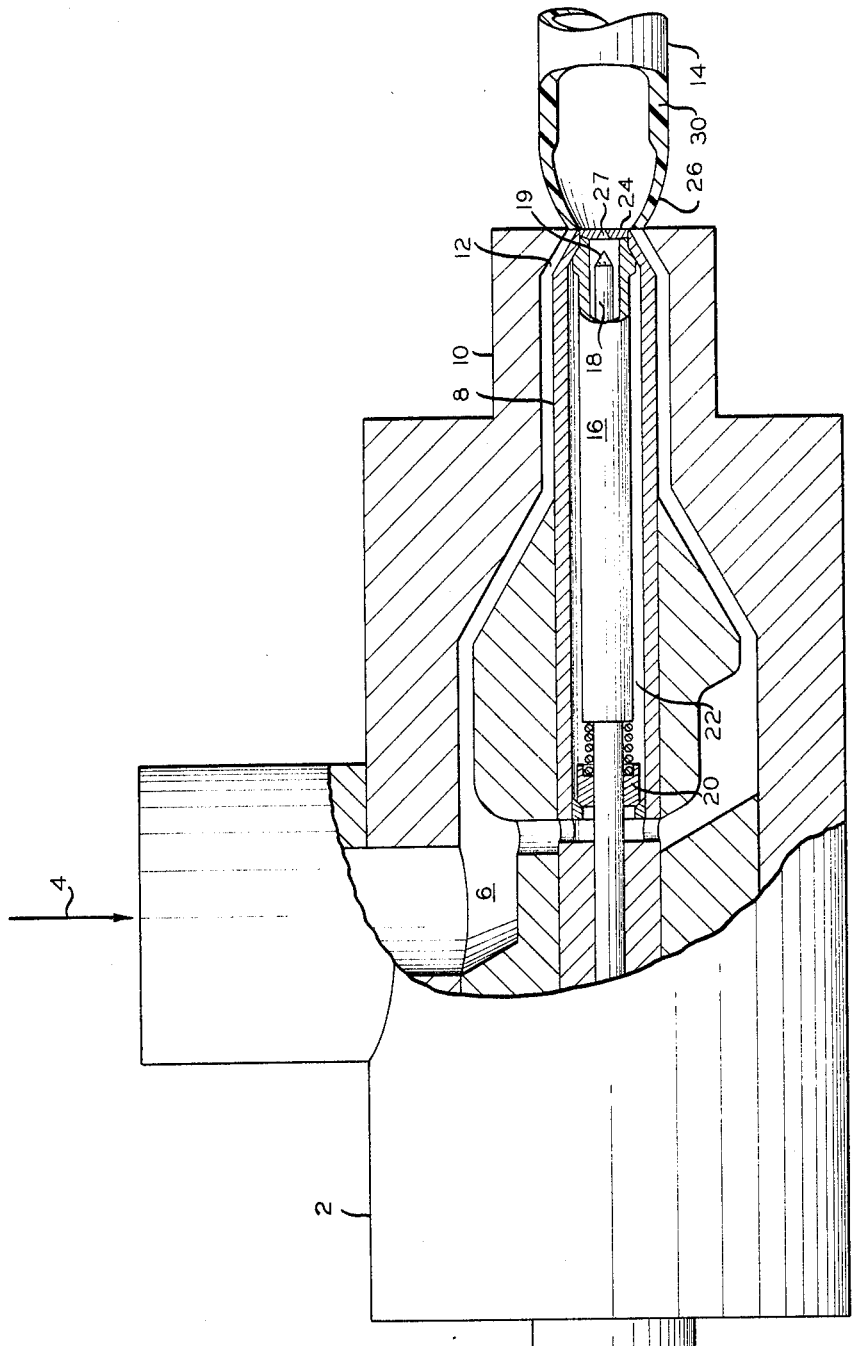
FIGURE 1 is a sectional view of an extrusion die head and die with an unsectioned mandrel core having parts broken away.

Referring in particular to FIGURE 1, a die head 2 is connected in a crosshead arrangement to an extruder (not shown). Polymer melt from the extruder, as depicted by arrow 4, enters the die head through opening 6 and flows around hollow axially movable mandrel 8. The outer surface of movable mandrel 8 and the inner surface of die bushing 10 define a first annular passage 12 which forms the tubular extrudate 14. Within movable mandrel 8 is axially movable hollow core 16, and within movable core 16 is axially movable air supply tube 18. A check valve 20 allows polymer to flow into a second annular passage 22 defined by the outer surface of movable core 16 and the inner surface of the hollow axially movable mandrel 8. At the forward end of core 16 is an air cooled face plate 24. Air supply tube 18 has a tip 19 containing holes 25 (shown in FIGURE 5). The end of tip 19 is closed and the sides are tapered to provide means for tip 19 to seat against face plate 24, thus covering aperture 27. In this view the movable mandrel is forward so as to extrude a thin wall tubular section 26 which will form the thread area of the ultimate product. During this part of the cycle the air supply tube is back so as to admit air into the tubular extrudate. A portion of the air admitted by the air supply tube flows around the air cooled face of the movable core and thence flows out via a third annular passage 28 defined by the outer surface of air supply tube 18 and the inner surface of hollow core 16.

Figure 2:
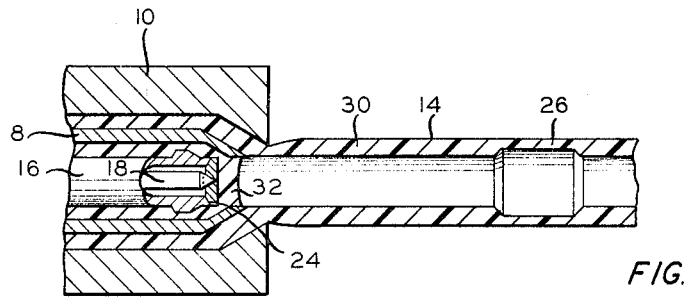
FIGURE 2 is a sectional view of the die of FIGURE 1 at a later stage in the extrusion cycle.

Referring now particularly to FIGURE 2, the extrusion is shown in a later part of the cycle wherein the movable mandrel 8 is in a retracted position so as to extrude a thick wall tubular section 30. The movable core 16 is also retracted and the air supply tube 18 is seated against the air cooled face plate 24. A plug of molten plastic 32 is extruded in front of this face plate.

Figure 3:
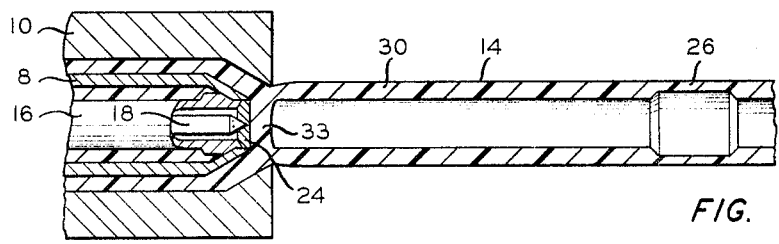
FIGURE 3 is a sectional view of the die of FIGURE 1 at a still later stage in the extrusion cycle.

Referring now particularly to FIGURE 3 the extrusion is shown in a still later part of the cycle wherein the movable core 16 has been moved axially forward pushing before it the plug of plastic 32 (FIGURE 2) which fuses to the still molten tubular extrudate to form a web 33 across the tubular extrudate which will become one end, generally a bottom end, 35 (FIGURE 7) of the parison preform and ultimately of the blown product. The air supply tube 18 is still seated against the face plate 24 of the movable core and movable mandrel 8 is still in the retracted position so as to extrude the thick wall tubular section.

Figure 4:
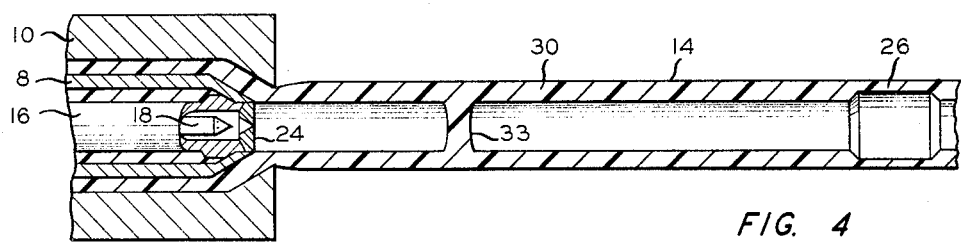
FIGURE 4 is a sectional view of the die of FIGURE 1 at yet a later stage in the extrusion cycle.

Referring now particularly to FIGURE 4 the extrudate is shown in yet a late part of the cycle wherein the movable core 16 is forward as in FIGURE 3 but the air supply tube 18 is moved axially back to admit air into the tubular extrudate. Movable mandrel 8 is still in the retracted position so as to extrude the thick wall tubular section.

Figure 5:
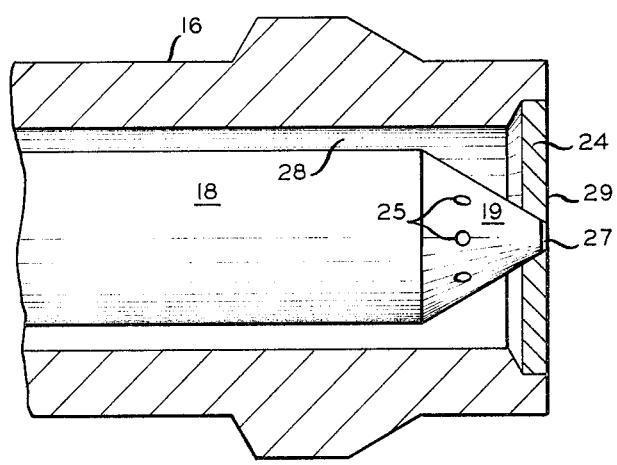
FIGURE 5 is an enlarged view of the tip of the movable core shown in FIGURE 1.

Referring in particular to FIGURE 5, the tip of air supply tube 18 is shown seated against the air cooled face plate as it is in the portions of the extrusion cycle shown in FIGURES 2 and 3. Air flows through holes 25 and impinges on the face plate 24 to cool the face plate but no air can pass through the aperture 27 into the interior of tubular extrudate 14. In the retracted position of air supply tube 18 as shown in FIGURES 1 and 4 part of the air flowing through holes 25 cools face plate 24 and part of the air flows through aperture 27 and thence into tubular extrudate 14. Face plate 24 can have a layer of fluorocarbon polymer or the like over its outer surface 29 to prevent sticking. It can also be channeled so cooling fluid can be circulated through it.

Figure 6:
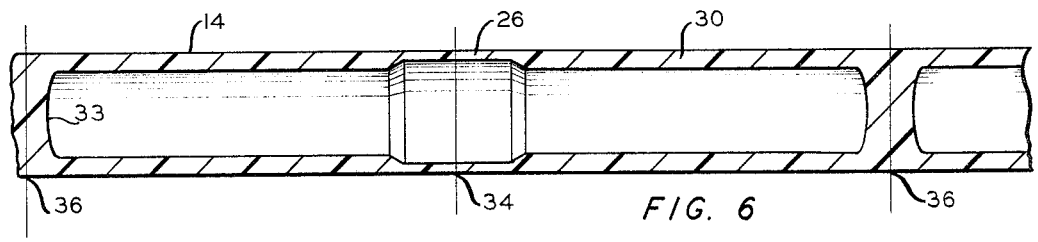
FIGURE 6 is a sectional view of a length of tubular extrudate comprising a series of parison preforms.

FIGURE 6 is a sectional view of the extrudate showing the product from a complete cycle wherein on severing the tubular extrudate radially at the midpoint 34 of the tubular section and through the midpoint 36 of the web two complete parison preforms are produced.

Figure 7:
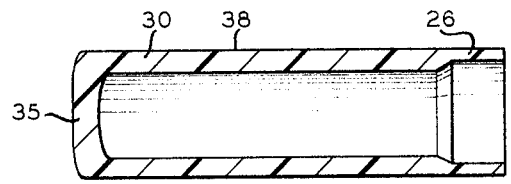
FIGURE 7 is a sectional view of a single closed end parison cut from the tubular extrudate of FIGURE 5.

FIGURE 7 shows a cross section of a single parison preform with an integral closed end.

Figure 8:
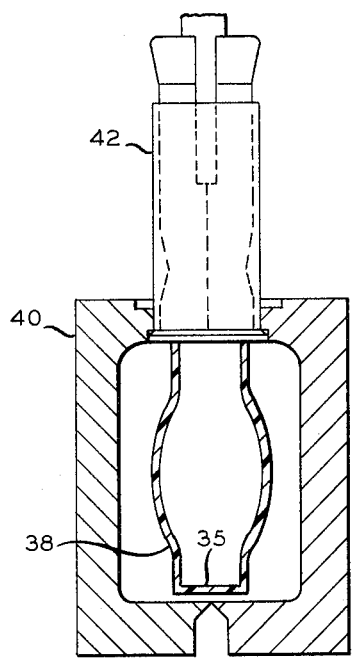
FIGURE 8 is a sectional view of a reheated closed end parison preform being blown into a finished part.

FIGURE 8 shows closed end parison 38, after having been reheated to the optimum temperature for orientation, in place in split cavity mold 40 and being blown out against the mold to form a hollow finished part such as a bottle. The closed end parison is held in place by split sleeve 42.

Figure 9:
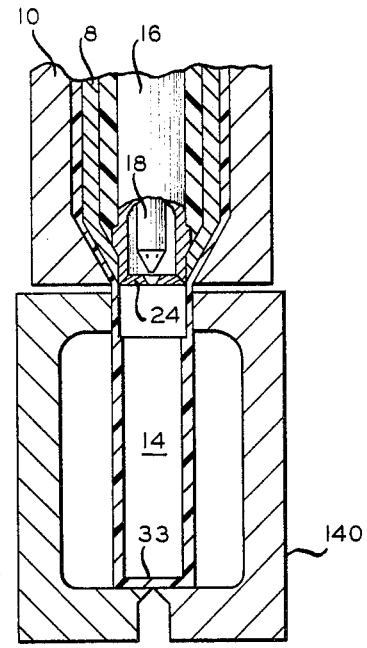
FIGURE 9 is a sectional view of an alternate embodiment of the invention.

FIGURE 9 shows an alternate embodiment of this invention in which a tubular extrudate with a web across its diameter is introduced directly into a split cavity mold 140 to be blown directly into a hollow finished part such as a bottle.

The drawings do not show conventional equipment such as temperature controllers, heaters, motors, means to move the movable mandrel, means to move the movable core, means to move the air supply tube and the like but the inclusion of such equipment is understood by those skilled in the art and is within the scope of the invention.

The air supply tube can serve to blow the tubular extrudate out, for instance, out against the walls of a sizing tube. Or the extrudate can be extruded directly into a water cooled sizing sleeve containing vacuum ports to pull the extrudate out against the inner walls of the sizing sleeve; in this case the air supply tube simply admits sufficient air to prevent a vacuum from forming within the tubular extrudate. This is necessary since the periodic webs across the extrudate preclude air entering from the other direction.

The finished closed end parison 38 can be transferred to a heating chamber and heated to its orientation temperature and then clamped at the thin wall section 26 by a split sleeve which forms the neck and threads of the container to be formed. A thread forming mandrel can be inserted into the open end to aid in forcing the polymer to conform to the shape of the inner surface of the split sleeve thus forming the threads. Simultaneous with this operation the parison can be stretched longitudinally; it can then be blown out against the walls of a split mold by introducing a fluid medium into the interior of the parison to form a biaxially oriented blow molded item as is shown in FIGURE 8.

The optimum orientation temperature varies from one material to another and is generally just below the melting point of the polymer. For instance for polypropylene this temperature is about 160–165° C. (320–329° F.).

Any plastic material suitable for forming blown items can be used in the practice of this invention. Preferred materials include: olefin polymers, particularly polymers and copolymers of ethylene, propylene, and 1-butene; nylon; poly(vinyl chloride); polycarbonates; acetal resins; fluorocarbon polymers; rubber; and the like. The plastic can contain conventional additives such as anti-oxidants, U.V. stabilizers, pigments, dispersing agents, lubricants, crosslinking agents and the like. It can also contain foaming agents so as to produce a cellular extrudate.

This invention can be utilized in the fabrication of all types of blow molded items such as hollow lids, spheres, moldings for toys and other hollow parts as well as for bottles, jars and other containers.

While this invention has been described in connection with the formation of a tubular extrudate with a programmed wall thickness it is also within the scope of this invention to form integral webs across tubular extrudates which are uniform in wall thickness, and thus wherein mandrel 8 is stationary.

The temperature of the die must be sufficient to maintain the plastic material in the molten condition and will vary widely depending on the plastic material being used.

While in the preferred embodiment the plastic material forming the plug is the same as the material forming the tubular extrudate, it is also within the scope of this invention to utilize one plastic material for the plug, and a different plastic material for the tubular extrudate by feeding polymer to second annular passage 22 from a separate extruder.

EXAMPLE

A polypropylene homopolymer of 0.905 density (ASTM D1505–63T) and 1 melt flow (ASTM D1238–62T Condition L) is plasticized in an extruder and delivered to a die head as shown in FIGURE 1. The melt temperature is 400° F. Tubular extrudate of 0.850 inch outside diameter is extruded at a rate of 2 feet per minute through a die held at 400° F. About $3^{13}/_{16}$ inches are extruded with a wall thickness of 0.150 inch, then about 1 inch is extruded with a wall thickness of about 0.090 inch by moving the mandrel forward, then about $3^{13}/_{16}$ inches more are extruded with a wall thickness of 0.150 inch, and finally a plug of plastic is formed by retracting a core within the mandrel, extruding a plug of plastic in front of the core and then moving the core forward to push the plug into contact with the tubular extrudate so as to form a web across the diameter of the tubular extrudate, said web being about ⅜ inch thick. This extrudate is introduced, immediately on leaving the die, into a water cooled vacuum sizing tube. Vacuum ports in this tube pull the extrudate out against the inner surface of the tube to impart a smooth even surface to the extrudate and to cool it to the point of being self-supporting. The resulting extrudate is severed radially with a circular saw at the midpoint of the thin wall section and at the midpoint of the web to form a closed end parison preform.

I claim:

1. A method of forming a tubular plastic extrudate having an integral web across its diameter comprising: forming a tubular plastic extrudate from an annular passage, forming a plug of molten plastic from a second annular passage, and injecting said plug of molten plastic into said tubular extrudate intermediate the walls and spaced from the end of said tubular extrudate while said extrudate and said plug are still in a molten condition so as to contact said molten plug and said molten extrudate and thus fuse said plug to said extrudate.

2. The method according to claim 1 wherein the tubular extrudate is formed continuously, a series of webs are formed across its diameter, and said extrudate is severed radially through the midpoint of each web and through the midpoint of each tubular section to form parisons with integral closed ends.

3. The method according to claim 1 wherein a section of tubular extrudate having an integral web across its diameter is introduced into a mold and blown directly into a hollow part.

4. A method according to claim 1 wherein said plug of molten plastic is formed in front of an axially movable core, and an air stream is impinged on the face plate of said core to cool said face plate during the entire extrusion cycle, and air is admitted to the interior of said tubular extrudate from the time said plug is injected until the time the next successive plug is being formed in front of said core.

5. A method according to claim 1 wherein said plastic is a polymer polymerized from a monomer selected from the group consisting of ethylene, propylene, 1-butene, and mixtures thereof.

6. A method according to claim 2 wherein said closed end parison is cooled and thereafter reheated to orientation temperature, introduced into a mold, and a fluid medium is introduced into said parison to cause it to expand and conform to the shape of the mold.

7. Apparatus for forming a tubular extrudate having an integral web across its diameter comprising in combination: (1) a die bushing and a hollow mandrel, the inner surface of said bushing and the outer surface of said mandrel defining a first annular passage (2) an axially movable hollow core positioned within said hollow mandrel, the outer surface of said core and the inner surface of said hollow mandrel defining a second annular passage (3) an air cooled face plate having an aperture affixed to the forward end of said core and (4) an axially movable air supply tube positioned within said core, said tube having a closed end, means for seating against the aperture of said face plate, and at least one hole back of said seating means, the outer surface of said tube and the inner surface of said hollow core defining a third annular passage.

8. Apparatus according to claim 7 wherein said hollow mandrel is axially movable.

9. Apparatus according to claim 7 in combination with a split cavity mold.

References Cited

UNITED STATES PATENTS

| | | | |
|---|---|---|---|
| 3,002,615 | 10/1961 | Lemelson | 18—14 |
| 3,129,461 | 4/1964 | Zavasnik et al. | 264—209 |
| 3,268,641 | 8/1966 | King | 264—97 |
| 3,314,105 | 4/1967 | Amsden | 264—97 |

ROBERT F. WHITE, Primary Examiner

JEFFERY R. THURLOW, Assistant Examiner

U.S. Cl. X.R.

18—14; 264—167, 173, 210